United States Patent Office 3,842,080
Patented Oct. 15, 1974

3,842,080
7-PHENYLPYRIMIDO[1,2-a][1,4]BENZODIAZEPIN-1(5H)-ONES
Jacob Szmuszkovicz, Kalamazoo, Mich., assignor to The Upjohn Company, Kalamazoo, Mich.
No Drawing. Filed Jan. 15, 1973, Ser. No. 323,766
Int. Cl. C07d 53/06
U.S. Cl. 260—256.4 F    13 Claims

ABSTRACT OF THE DISCLOSURE

7 - Phenylpyrimido[1,2-a][1,4]benzodiazepin - 1(5H)-ones of the formula III:

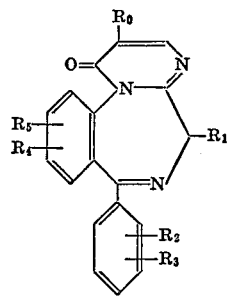

III wherein $R_0$ is selected from the group consisting of hydrogen, methyl, hydroxymethyl, and —$COOR_6$, in which $R_6$ is hydrogen or alkyl of 1 to 3 carbon atoms, inclusive; wherein $R_1$ is selected from the group consisting of hydrogen, hydroxy, acetoxy, propionoxy, succinyloxy alkyl esters in which alkyl is defined as above; and wherein $R_2$, $R_3$, $R_4$ and $R_5$ are selected from the group consisting of hydrogen, halogen, nitro, cyano, trifluoromethyl, and alkyl, alkoxy, alkylthio, alkylsulfinyl, alkylsulfonyl, alkanoylamino in which the carbon moiety is of 1 to 3 carbon atoms, inclusive, and dialkylamino in which alkyl is defined as above, are prepared by heating a compound of the formula (I):

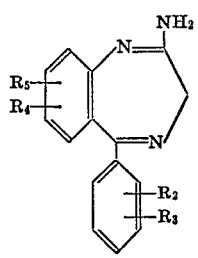

I with a dialkyl alkoxymethylenemalonate and heating the resulting product (II) with a mixture of diphenyl and diphenyloxide (Dowtherm A) to obtain a compound of formula IIIa in which $R_0$ is —$COOR_6$; saponifying IIIa to obtain IIIb and decarboxylating IIIb to obtain IIIc. Other compounds of formula III are obtained by selectively reducing IIIa, esterifying the resulting 1-hydroxymethyl product IIId, and treating the resulting ester IIIe with lithium aluminum hydride to give the corresponding 1-methyl substituted product IIIf.

The compounds of formulae IIIa, IIIb, IIIc, IIId, and IIIf can further be converted by standard methods to their N-oxides corresponding to formula III and to the pharmacologically acceptable acid addition salts thereof.

The compounds of formula III, the pharmacologically acceptable acid addition salts and N-oxides thereof are useful for the treatment of mammals and birds in need of tranquilization and sedation.

BACKGROUND OF THE INVENTION

Field of the invention

This invention is directed to new organic compounds and is particularly concerned with novel 7-phenylpyrimido-[1,2-a][1,4]benzodiazepin - 1(5H) - ones (III), intermediates therefor and the process of production therefor. The invention furthermore includes the pharmaceutically acceptable acid addition salts and the N-oxides.

The novel compounds III, intermediates, and the process of production thereof can be illustratively represented as follows:

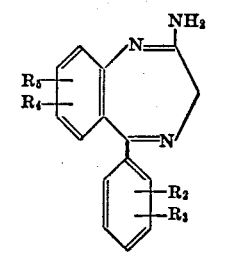

I

↓ dialkyl alkoxymethylene malonate

II

↓

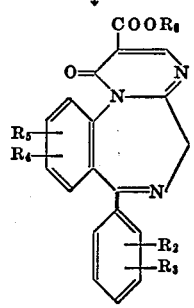

IIIa

↓

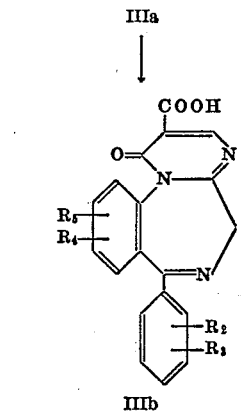

IIIb

↓ decarboxylation

↓

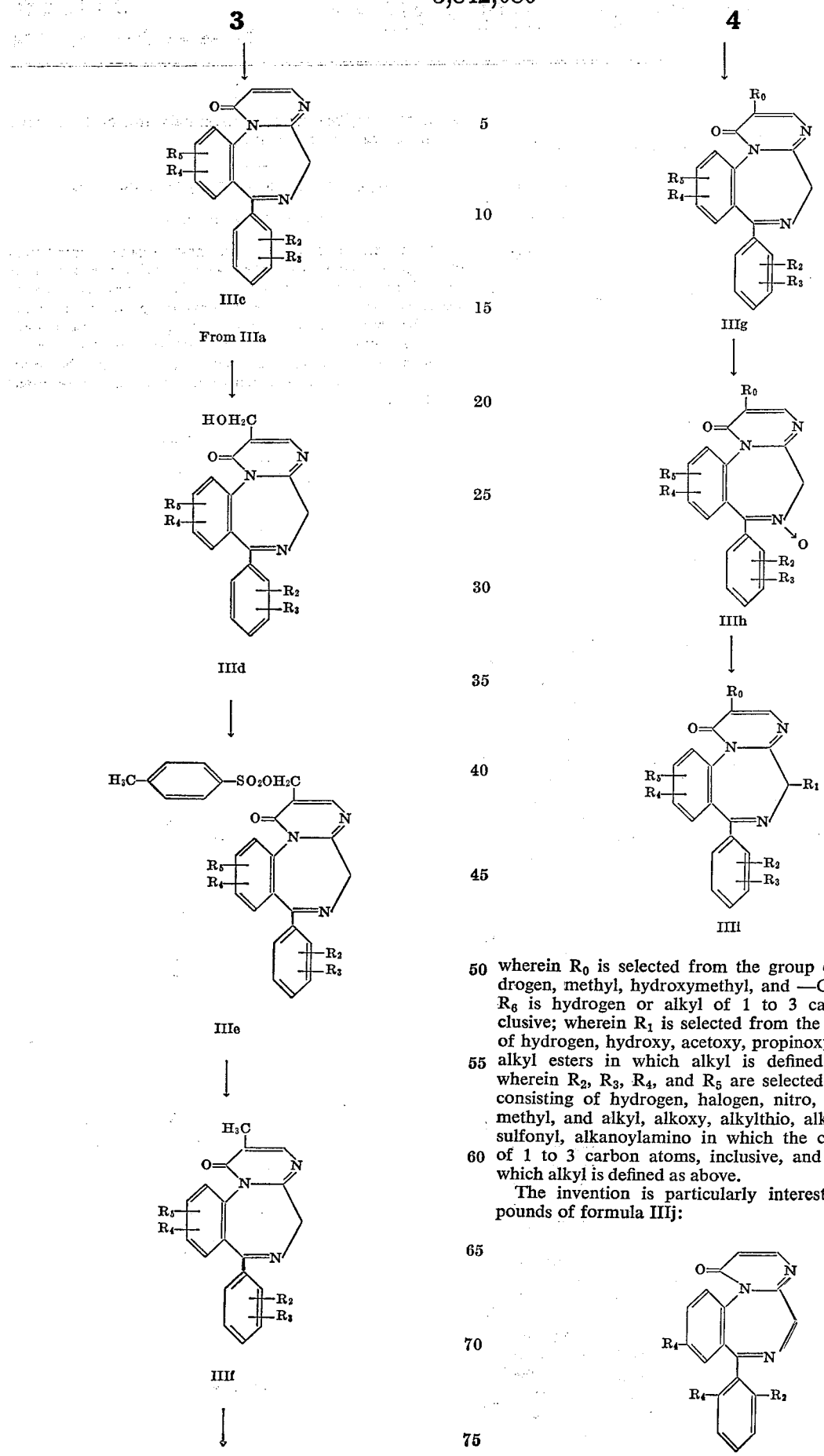

wherein $R_0$ is selected from the group consisting of hydrogen, methyl, hydroxymethyl, and $-COOR_6$, in which $R_6$ is hydrogen or alkyl of 1 to 3 carbon atoms, inclusive; wherein $R_1$ is selected from the group consisting of hydrogen, hydroxy, acetoxy, propinoxy, or succinyloxy alkyl esters in which alkyl is defined as above; and wherein $R_2$, $R_3$, $R_4$, and $R_5$ are selected from the group consisting of hydrogen, halogen, nitro, cyano, trifluoromethyl, and alkyl, alkoxy, alkylthio, alkylsulfinyl, alkylsulfonyl, alkanoylamino in which the carbon moiety is of 1 to 3 carbon atoms, inclusive, and dialkylamino in which alkyl is defined as above.

The invention is particularly interested in the compounds of formula IIIj:

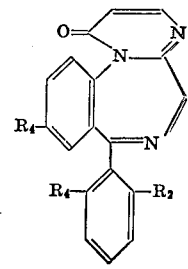

wherein $R_2$, $R_3$, and $R_4$ are selected from the group consisting of hydrogen, fluorine, chlorine, bromine, nitro, cyano, and trifluoromethyl.

The most desirable compounds of this invention have the formula IIIk

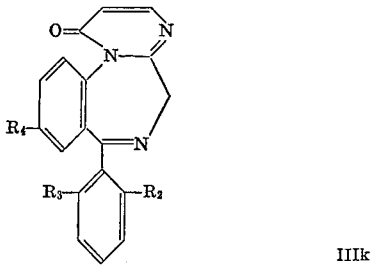

IIIk wherein $R_2$, $R_3$, and $R_4$ are selected from the group consisting of hydrogen and chlorine.

Furthermore, this invention includes the compound of formula III (which formula includes the subspecies IIIa, IIIb, IIIc, IIId, IIIf, IIIh, IIIi, IIIj, and IIIk) as acid addition salts of pharmacologically acceptable acids and as N-oxides. The free base, the pharmacologically acceptable acid salts, and N-oxides are useful as tranquilizing and sedative agents.

The basic process of this invention comprises heating a compound of formula I with a dialkylalkoxymethylenemalonate to yield the compound II; heating II with Dowtherm A to give compound IIIa; saponifying IIIa with a base to obtain IIIb; and decarboxylating IIIb to obtain compound IIIc. Compounds IIId, e, and f are obtained by selectively reducing a compound of formula IIIa with LiAlH$_4$ to obtain a compound of formula IIId; esterifying IIId with p-toluenesulfonylchloride to obtain the corresponding ester IIIe and treating IIIe with lithium aluminum hydride to obtain IIIf.

Compounds of formulae IIIa–IIIf can be converted to their 6-N-oxide derivatives IIIh and these by conventional means into 5-substituted products of formula IIIi in which $R_1$ is hydroxy, acetoxy, propionoxy, and hemisuccinyloxy.

DESCRIPTION OF THE PREFERRED EMBODIMENT

Alkyl groups of 1 to 3 carbon atoms, inclusive, are exemplified by methyl, ethyl, propyl, and isopropyl.

The carbon chain moiety of alkoxy, alkylthio, alkylsulfinyl, and alkylsulfonyl, dialkylamino of 1 to 3 carbon atoms, inclusive, is defined as alkyl of 1 to 3 carbon atoms, inclusive, above.

The alkanoylamino group with 1 to 3 carbon atoms, inclusive, consists of formamido, acetamido, and propionamido.

The term halogen includes fluorine, chlorine, bromine, and iodine.

The novel compounds of the formula III comprising compounds IIIa, IIIb, IIIc, IIId, IIIf, IIIg, IIIh, IIIi, IIIj, and IIIk and including acid addition salts and N-oxides thereof have sedative, tranquilizing, hypnotic, anticonvulsant, antianxiety, and muscle relaxant effects in mammals and birds.

The acid addition salts of compounds of formula III, contemplated in this invention, are the hydrochlorides, hydrobromides, hydriodide, sulfates, phosphates, cyclohexanesulfamates, methanesulfonates, ethanesulfonates, benzenesulfonates, toluenesulfonates, β-naphthalenesulfonates, and the like, prepared by reacting a compound of formula III with the stoichiometrically calculated amount of the selected pharmacologically acceptable acids.

The compounds (III) of this invention were screened in mice (in groups of 6 to 8) by standard procedures such as chimney, pedestal, and dish test and also as antagonists to strychnine, nicotine and metrazol. These tests showed that the compounds of formula III were excellent as sedatives, tranquilizers, hypnotic, muscle relaxants, anticonvulsant, and anti-anxiety, and could be administered orally or parenterally to mammals such as domestic pet animals, e.g. dogs, cats, monkeys, or a pet bird, such as parrots. They are also useful during the transportation of cattle, sheep, swine, or zoo animals of the mammal or bird class.

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose, and the like may be used as carriers or for coating purposes. Water or oil, e.g., coconut oil, sesame oil, safflower oil, cottonseed oil, peanut oil may be used for preparing solutions or suspensions of the active drug. Sweetening, coloring, and flavoring agents may be added.

For mammals and birds, food premixes with starch, oatmeal, dried fishmeat, fishmeal, flour, and the like can be prepared.

As tranquilizers, the compounds of formula III and their pharmacologically acceptable acid addition salts and N-oxides can be used in dosages of 0.01–2 or preferably 0.02–0.3 mg./kg. in oral or injectable preparations, as described above, to alleviate tension and anxiety in mammals, or birds, such as e.g., occurs when animals are in travel.

Other acid addition salts of the compounds of formula III can be made such as the fluosilicic acid addition salts which are useful mothproofing compounds or the trichloroacetates useful as herbicides against Johnson grass, Bermuda grass, yellow foxtail, and green foxtail, and quack grass.

The starting compounds used in this invention are 2-amino-5-phenyl-3H-1,4-benzodiazepines (I). These amines (I) are prepared from the well-known 1,3-dihydro-5-phenyl-2H[1,4]benzodiazepin-2-thiones [Archer et al., J. Org. Chem. 29, 231 (1964) and U.S. Pat. 3,422,091] by treatment of such thiones with ammonia in methanol. Details of this reaction are shown in Preparation 1.

Representative 2-amino compounds of formula I thus produced, include:

2-amino-5-phenyl-3H-1,4-benzodiazepine;
2-amino-7-chloro-5-phenyl-3H-1,4-benzodiazepine;
2-amino-6-chloro-5-(m-bromophenyl)-3H-1,4-benzodiazepine;
2-amino-8-chloro-5-(o-chlorophenyl)-3H-1,4-benzodiazepine;
2-amino-7-bromo-5-phenyl-3H-1,4-benzodiazepine;
2-amino-7-chloro-5-(3,4-dimethylphenyl)-3H-1,4-benzodiazepine;
2-amino-5-(2-methyl-4-methoxyphenyl)-3H-1,4-benzodiazepine;
2-amino-7-methyl-5-phenyl-3H-1,4-benzodiazepine;
2-amino-7-nitro-5-phenyl-3H-1,4-benzodiazepine;
2-amino-7-nitro-5-(o-chlorophenyl)-3H-1,4-benzodiazepine;
2-amino-7-fluoro-5-phenyl-3H-1,4-benzodiazepine;
2-amino-7-chloro-5-(2,6-difluorophenyl)-3H-1,4-benzodiazepine;
2-amino-7-trifluoromethyl-5-phenyl-3H-1,4-benzodiazepine;
2-amino-9-trifluoromethyl-5-[p-(propionylamino)phenyl]-3H-1,4-benzodiazepine;
2-amino-8-cyano-5-[p-(trifluoromethyl)phenyl]-3H-1,4-benzodiazepine;
2-amino-7-chloro-5-(o-chlorophenyl)-3H-1,4-benzodiazepine;
2-amino-6-ethylthio-5-(o-bromophenyl)-3H-1,4-benzodiazepine;
2-amino-6,8-dichloro-5-(o-fluorophenyl)-3H-1,4-benzodiazepine;

2-amino-8-propoxy-7-bromo-5-[m-(ethylsulfinyl)phenyl]-3H-1,4-benzodiazepine;
2-amino-9-diisopropylamino-7-methyl-5-[m-(propylsulfonyl)phenyl]-3H-1,4-benzodiazepine;
2-amino-7-bromo-5-(o-fluorophenyl)-3H-1,4-benzodiazepine;
2-amino-7-chloro-5-(2,6-difluorophenyl)-3H-1,4-benzodiazepine;
2-amino-7-trifluoromethyl-5-phenyl-3H-1,4-benzodiazepine;
2-amino-5-(p-fluorophenyl)-3H-1,4-benzodiazepine;
2-amino-7-nitro-5-(o-iodophenyl)-3H-1,4-benzodiazepine;
2-amino-5-(o-chlorophenyl)-3H-1,4-benzodiazepine;
2-amino-7-bromo-5-(o-bromophenyl)-3H-1,4-benzodiazepine;
2-amino-7-methylsulfinyl-5-(o-fluorophenyl)-3H-1,4-benzodiazepine;
2-amino-7-methyl-5-(o-chlorophenyl)-3H-1,4-benzodiazepine;
2-amino-7-methylthio-5-phenyl-3H-1,4-benzodiazepine;
2-amino-7-cyano-5-(o-chlorophenyl)-3H-1,4-benzodiazepine;
2-amino-6,8-dimethyl-5-(o-chlorophenyl)-3H-1,4-benzodiazepine;
2-amino-9-propylsulfonyl-7-methyl-5-phenyl-3H-1,4-benzodiazepine;
2-amino-7-trifluoromethyl-5-(o-chlorophenyl)-3H-1,4-benzodiazepine;
2-amino-7-dimethylamino-5-phenyl-3H-1,4-benzodiazepine;
2-amino-7-fluoro-5-(o-chlorophenyl)-3H-1,4-benzodiazepine;
2-amino-7,8-dicyano-5-[p-(methylsulfonyl)phenyl]-3H-1,4-benzodiazepine;
2-amino-6,9-dichloro-5-(p-isopropylphenyl)-3H-1,4-benzodiazepine;
2-amino-6-methoxy-5-(2,4-diethoxyphenyl)-3H-1,4-benzodiazepine;
2-amino-9-propionamido-5-[p-(trifluoromethyl)phenyl]-3H-1,4-benzodiazepine;
2-amino-6,8-diethyl-5-(m-ethylphenyl)-3H-1,4-benzodiazepine;
2-amino-6-nitro-5-(o-cyanophenyl)-3H-1,4-benzodiazepine;
2-amino-7,9-bis(dipropylamino)-5-(o-nitrophenyl)-3H-1,4-benzodiazepine;
2-amino-9-acetylamino-5-(p-cyanophenyl)-3H-1,4-benzodiazepine;
and the like.

In carrying out the process of the invention, a selected 2-amino-5-phenyl-3H-1,4-benzodiazepine (I) is reacted with an dialkylalkoxymethylene malonate of the formula

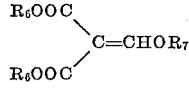

wherein $R_6$ and $R_7$ are alkyl of one to three carbon atoms. The reaction is carried out preferably between ½ to 3 hours at 90–140° C. with about equimolecular amounts of starting compound and reagent, without solvent. The resulting product II is recovered and purified by conventional means, such as extraction, chromatography, and crystallization.

The products of formula II are formed by condensing I either at the 2-amino group or at the nitrogen of the 1-position. In naming II in later examples we have used the compound formed by the condensation in the 2-position of compound II. The other isomer requires, when compound IIIa is prepared, a rearrangement and condensation.

Compound II is then heated with a mixture of diphenyl and diphenyl oxide (Dowtherm A, trademark) to a temperature of 200–260° C., preferably 240–250° C. The solvent is evaporated in vacuo and the product IIIa is recovered and purified in conventional manner by extraction, crystallization, and the like.

Compound IIIa is saponified at temperatures between 0–100° C. in water with a low concentration of sodium or potassium hydroxide. In the preferred embodiment of this invention, the base used is aqueous sodium or potassium hydroxide or carbonate in a strength of 0.5 to 3% at temperatures between 0–10° C. Thereafter the reaction mixture is heated to 50–100° C. for a period until a complete solution results. At the termination of the reaction, the product IIIb is recovered and purified in conventional manner by extraction, chromatography, and crystallization.

Compound IIIc is obtained by heating compound IIIb to about 200–250° C. until carbon dioxide evolution has ceased. The remaining product is then recovered and purified by extraction, chromatography and/or crystallization.

Compound IIIc (III when $R_0$ is hydrogen) or compound IIIa (III when $R_0$ is —COOR, R=alkyl) can be converted by known procedures via the N-oxides IIIh to compounds IIId (III wherein $R_1$ is hydroxy or acyloxy).

The following Preparation and Examples are illustrative of the products and processes of the present invention, but are not to be construed as limiting.

PREPARATION

2-Amino-7-chloro-5-phenyl-3H-1,4-benzodiazepine

A solution of 2.87 g. (10 millimoles) of 7-chloro-1,3-dihydro-5-phenyl-2H-1,4-benzodiazepin - 2 - thione in 50 ml. of methanol saturated with ammonia gas was stirred at 24–26° C. (room temperature) for 2½ hours. Crystallization occurred during stirring. The crystals of 2-amino-7-chloro-5-phenyl-3H-1,4-benzodiazepine were recovered by filtration and dried to yield 1.55 g. (57.5%) of 2 - amino-7-chloro-5-phenyl-3H-1,4-benzodiazepine of melting point 236–237° C.

Analysis.—Calcd. for $C_{15}H_{12}ClN_3$: C, 66.79; H, 4.49; Cl, 13.15; N, 15.57. Found: C, 66.97; H, 4.53; Cl, 13.15; N, 15.49.

In the manner given above (Preparation) other 2-thiones are treated with ammoniacal methanol to give the corresponding 2-amino - 5 - phenyl-3H-1,4-benzodiazepines.

EXAMPLE 1

Diethyl[[(7-chloro-5-phenyl-3H-1,4-benzodiazepin-2-yl)amino]methylene]malonate

A mixture of 2-amino-7-chloro-5-phenyl-3H-1,4-benzodiazepine (26.9 g.; 0.1 mole) and diethyl ethoxymethylenemalonate (21.6 g.; 0.1 mole) was heated for 1 hour at 110–120° using a take-off condenser. The resulting thick oil was chromatographed on 3 kg. of silica gel using 30% ethyl acetate-70% cyclohexane. Fractions 1–29 (400 ml. each) gave no material. Fractions 30–39 (250 ml. each) gave 45 g. (one spot by thin layer chromatography. Crystallization from Skelly B hexanes and a trace of ether gave 35 g. of diethyl [[(7-chloro-5-phenyl-3H-1,4-benzodiazepine-2-yl)amino]methylene]malonate, melting point 99–102.5° C., raised to 105–107° C. on recrystallization from ether.

Analysis.—Calcd. for $C_{23}H_{22}ClN_3O_4$: C, 62.80; H, 5.04; Cl, 8.06; N, 9.55. Found: C, 63.16; H, 5.13; Cl, 8.00; N, 9.48.

EXAMPLE 2

2-Carbethoxy-9-chloro-7-phenylpyrimido[1,2-a][1,4]benzodiazepin-1(5H)-one

A solution of diethyl[[7-chloro-5-phenyl-3H-1,4-benzodiazepine - 2 - yl)amino]methylene]malonate (35.9 g.; 0.0816 mole) in 150 ml. of Dowtherm A was added during 6 minutes with stirring to 700 ml. of Dowtherm A, preheated to 240° C., and the solution was heated for 10 minutes at 240–248° C. The solvent was then evaporated at 0.1 mm. Hg on the steam bath. The residue was diluted with 500 ml. of ether. The resulting solid was treated with 4 l. of boiling ether, the mixture was filtered to remove the insoluble material and the filtrate was concentrated to ca. 1 l. to give 2-carbethoxy-9-chloro-7-phenylpyrimido [1,2-a][1,4]benzodiazepin-1(5H)-one in two crops: 8.4 g., melting point 137–138.5° C. and 9.5 g., melting point 137–139° C. The analytical sample melted at 139–140° C. (when recrystallized from ether).

Analysis.—Calcd. for $C_{21}H_{16}ClN_3O_3$: C, 64.04; H, 4.10; Cl, 9.00, N, 10.67. Found: C, 64.55; H, 4.13; Cl, 8.83; N, 10.83.

EXAMPLE 3

2-Carboxy-9-chloro-7-phenylpyrimido[1,2-a][1,4] benzodiazepin-1(5H)-one

2-Carbethoxy-9-chloro-7 - phenylpyrimido[1,2-a][1,4]-benzodiazepin-1(5H)-one (1.01 g.; 2.56 mmole) was added with stirring to 22 ml. of 1% aqueous sodium hydroxide solution kept at 0 to 5° C. and the mixture was stirred at this temperature for 1 hour. The suspension was then heated on the steam bath. After 4 minutes the temperature reached 87° C. and a solution resulted. It was cooled to room temperature and 0.45 ml. of acetic acid was added. The resulting solid was filtered, washed with water, and dried at 40° C. for two days. The solid acid (0.730 g.) was recrystallized from chloroform-ether to give 0.55 of 2-carboxy-9-chloro-7-phenylpyrimido[1,2-a][1,4]benzodiazepin-1(5H)-one of melting point 195° C. (efferv).

EXAMPLE 4

9-Chloro-7-phenylpyrimido[1,2-a][1,4] benzodiazepin-1(5H)-one 8.3 g. of 2-carboxy-9-chloro-7-phenylpyrimido[1,2-a]-[1,4]benzodiazepin-1(5H)-one was heated at 210–215° for 12 minutes. The residue was extracted with ether. The ether-soluble product, thus obtained, was chromatographed on 220 g. of silica gel eluting with 30% ethyl acetate-cyclohexane. Fractions 1–5 (250 ml. each) gave no material. Fractions 6–7 (200 ml. each) gave 0.126 g. of an unidentified product. Fraction 8 (0.05 g.) was discarded. Fractions 9–14 gave no material. Elution was continued with 50% ethyl acetate-cyclohexane. Fraction 15 (200 ml.) gave no material. Fractions 16–19 (100 ml. each) gave an unidentified solid. Fraction 20 gave a trace. Fraction 21 gave 0.03 g. Elution was continued with ethyl acetate. Fractions 22–26 were combined with fraction 21 and crystallized from ether to give 0.61 g. of the desired product. Recrystallization from ether gave 0.395 g. of 9-chloro - 7 - phenylpyrimido[1,2-a][1,4]benzodiazepin-1(5H)-one of melting point 187–188.5° C., unchanged on recrystallization. A second crop of 98 mg., melting point 186–187° C., was also obtained.

EXAMPLE 5

Diethyl[[7-chloro-5-(o-chlorophenyl)-3H-1,4-benzodiazepine-2-yl)amino]methylene]malonate In the manner given in Example 1, 2-amino-7-chloro-5 - (o-chlorophenyl)-3H-1,4-benzodiazepine was heated with diethyl ethoxymethylenemalonate to give diethyl [[(7-chloro-5-(o-chlorophenyl)-3H - 1,4 - benzodiazepin-2-yl)amino]methylene]malonate.

EXAMPLE 6

2-Carbethoxy-9-chloro-7-(o-chlorophenyl)pyrimido [1,2-a][1,4]benzodiazepin-1(5H)-one In the manner given in Example 2, diethyl[[(7-chloro-5-(o-chlorophenyl)-3H-1,4-benzodiazepin - 2 - yl)-amino]methylene]malonate was heated with Dowtherm A (a mixture of diphenyl and diphenyloxide) to give 2-carbethoxy-9-chloro-7-(o - chlorophenyl)pyrimido[1,2-a] [1,4]-benzodiazepin-1(5H)-one.

EXAMPLE 7

2-Carboxy-9-chloro-7-(o-chlorophenyl)pyrimido-[1,2-a] [1,4]benzodiazepin-1(5H)-one In the manner given in Example 3, 2-carbethoxy-9-chloro-7 - (o - chlorophenyl)pyrimido[1,2-a][1,4]benzodiazepin-1(5H)-one was heated with aqueous sodium hydroxide to give 2-carboxy-9-chloro-7-(o-chlorophenyl)pyrimido[1,2-a][1,4]benzodiazepin-1(5H)-one.

EXAMPLE 8

9-Chloro-7-(o-chlorophenyl)pyrimido[1,2-a][1,4]-benzodiazepin-1(5H)-one

In the manner given in Example 4, 2-carboxy-9-chloro-7 - (o-chlorophenyl)pyrimido[1,2-a][1,4]benzodiazepin-1(5H) - one was heated to 220° C. to give 9 - chloro-7 - (o - chlorophenyl)pyrimido[1,2-a][1,4]benzodiazepine-1(5H)-one.

EXAMPLE 9

Dimethl[[(7-nitro-5-(o-chlorophenyl)-3H-1,4-benzodiazepine-2-yl)amino]methylene]malonate In the manner given in Example 1, 2-amino-7-nitro-5-(o-chlorophenyl)-3H-1,4-benzodiazepine is heated with dimethyl methoxymethylenemalonate to give dimethyl [[(7-nitro-5-(o-chlorophenyl)-3H-1,4-benzodiazepin - 2 - yl) amino]methylene]malonate.

EXAMPLE 10

2-Carbomethoxy-9-nitro-7-(o-chlorophenyl)pyrimido-[1,2-a][1,4]benzodiazepin-1(5H)-one In the manner given in Example 2, dimethyl [[(7-nitro-5 - (o-chlorophenyl) - 3H-1,4-benzodiazepin-2-yl)amino] methylene]malonate was heated with Dowtherm A (a mixture of diphenyl and diphenyloxide) to give 2-carbomethoxy - 9 - nitro-7-(o-chlorophenyl)pyrimido[1,2-a] [1,4]benzodiazepin-1(5H-one.

EXAMPLE 11

2-Carboxy-9-nitro-7-(o-chlorophenyl)pyrimido-[1,2-a][1,4]benzodiazepin-1(5H)-one In the manner given in Example 3, 2-carbomethoxy-9-nitro - 7 - (o-chlorophenyl)pyrimido[1,2-a][1,4]benzodiazepin-1(5H)-one was heated with aqueous potassium hydroxide to give 2-carboxy-9-nitro-7-(o-chlorophenyl) pyrimido[1,2-a][1,4]benzodiazepin-1(5H)-one.

EXAMPLE 12

9-Nitro-7-(o-chlorophenyl)pyrimido[1,2-a]-[1,4]benzodiazepin-1(5H)-one

In the manner given in Example 4, 2-carboxy-9-nitro-7 - (o-chlorophenyl)pyrimido[1,2-a][1,4]benzodiazepin-1(5H)-one was heated to 220° C. to give 9-nitro-7-(o-chlorophenyl)pyrimido[1,2-a][1,4]benzodiazepin - 1-(5H)-one.

EXAMPLE 13

Diethyl[[(7 - trifluoromethyl - 5-(2,6-difluorophenyl)-3H - 1,4 - benzodiazepine - 2-yl)amino]methylene] malonate In the manner given in Example 1, 2-amino-7-trifluoromethyl - 5 - (2,6-difluorophenyl)-3H-1,4-benzodiazepine was heated with diethyl ethoxymethylenemalonate to give diethyl[[(7 - trifluoromethyl - 5-(2,6-difluorophenyl)-3H-1,4-benzodiazepin-2-yl)amino]methylene]malonate.

EXAMPLE 14

2-Carboethoxy-9-trifluoromethyl-7-(2,6-difluorophenyl) pyrimido[1,2-a][1,4]benzodiazepin-1(5H)-one In the manner given in Example 2, diethyl [[(7-trifluoromethyl - 5 - (2,6 - difluorophenyl)-3H-1,4-benzodiazepine-2-yl)amino]methylene]malonate was heated with Dowtherm A (a mixture of diphenyl and diphenyloxide) to give 2-carbethoxy-9-trifluoromethyl-7-(2,6-difluorophenyl)pyrimido[1,2-a][1,4]benzodiazepin - 1-(5H)-one.

EXAMPLE 15

2-Carboxy-9-trifluoromethyl-7-(2,6-difluorophenyl)pyrimido[1,2-a][1,4]benzodiazepin-1(5H)-one In the manner given in Example 3, 2-carbethoxy-9-trifluoromethyl - 7 - (2,6 - difluorophenyl)pyrimido[1,2-a][1,4]benzodiazepin-1(5H)-one was heated with aqueous sodium hydroxide to give 2-carboxy-9-trifluoromethyl-7-(2,6 - difluorophenyl)pyrimido[1,2-a][1,4]benzodiazepin-1(5H)-one.

EXAMPLE 16

9-Trifluoromethyl-7-(2,6-difluorophenyl)pyrimido-[1,2-a][1,4]benzodiazepin-1(5H)-one In the manner given in Example 4, 2-carboxy-9-trifluoromethyl - 7 - (2,6 - difluorophenyl)pyrimido[1,2-a][1,4]benzodiazepin-1(5H)-one was heated to 220° C. to give 9 - trifluoromethyl - 7-(2,6-difluorophenyl)pyrimido-[1,2-a][1,4]benzodiazepin-1(5H)-one.

EXAMPLE 17

Dimethyl[[(7-fluoro-5-(o-chlorophenyl)-3H-1,4-benzodiazepine-2-yl)amino]methylene]malonate In the manner given in Example 1, 2-amino-7-fluoro-5 - (o-chlorophenyl) - 3H - 1,4 - benzodiazepine was heated with dimethyl methoxymethylenemalonate to give dimethyl[[(7 - fluoro - 5-(o-chlorophenyl)-3H-1,4-benzodiazepine-2-yl)amino]methylene]malonate.

EXAMPLE 18

2-Carbomethoxy-9-fluoro-7-(o-chlorophenyl)pyrimido-[1,2-a][1,4]benzodiazepin-1(5H)-one In the manner given in Example 2, dimethyl[[(7-fluoro-5 - (o-chlorophenyl) - 3H - 1,4 - benzodiazepine-2-yl)-amino]methylene]malonate was heated with Dowtherm A (a mixture of diphenyl and diphenyloxide) to give 2-carbomethoxy - 9 - fluoro - 7 - (o-chlorophenyl)pyrimido-[1,2-a][1,4]benzodiazepin-1(5H)-one.

EXAMPLE 19

2-Carboxy-9-fluoro-7-(o-chlorophenyl)pyrimido[1,2-a][1,4]benzodiazepine-1(5H)-one In the manner given in Example 3, 2-carbomethoxy-9-fluoro - 7 - (o-chlorophenyl)pyrimido[1,2-a][1,4]benzodiazepin-1(5H)-one was heated with aqueous sodium hydroxide to give 2 - carboxy - 9 - fluoro - 7 - (o-chlorophenyl)pyrimido[1,2-a][1,4]benzodiazepin-1(5H)-one.

EXAMPLE 20

9-Fluoro-7-(o-chlorophenyl)pyrimido[1,2-a][1,4]benzodiazepin-1(5H)-one

In the manner given in Example 4, 2-carboxy-9-fluoro-7 - (o-chlorophenyl)pyrimido[1,2-a][1,4]benzodiazepin-1(5H)-one was heated to 220° C. to give 9-fluoro-7-(o-chlorophenyl)pyrimido[1,2-a][1,4]benzodiazepin - 1-(5H)-one.

EXAMPLE 21

Dipropyl[[(9-bromo-5-(m-bromophenyl)-3H-1,4-benzodiazepine-2-yl)amino]methylene]malonate In the manner given in Example 1, 2-amino-9-bromo-5 - (m-bromophenyl) - 3H-1,4-benzodiazepine was heated with dipropyl propoxymethylenemalonate to give dipropyl[[(9 - bromo - 5-(m-bromophenyl)-3H-1,4-benzodiazepin-2-yl)amino]methylene]malonate.

EXAMPLE 22

2-Carbopropoxy-11-bromo-7-(m-bromophenyl)pyrimido-[1,2-a][1,4]benzodiazepin-1(5H)-one In the manner given in Example 2, dipropyl[[(9-bromo - 5 - (m-bromophenyl) - 3H - 1,4-benzodiazepine-2-yl)amino]methylene]malonate was heated with Dowtherm A (a mixture of diphenyl and diphenyloxide) to give 2 - carbopropoxy - 11-bromo-7-(m-bromophenyl)pyrimido[1,2-a][1,4]benzodiazepin-1(5H)-one.

EXAMPLE 23

2-Carboxy-11-bromo-7-(m-bromophenyl)pyrimido-[1,2-a][1,4]benzodiazepin-1(5H)-one In the manner given in Example 3, 2-carbopropoxy-11-bromo - 7 - (m-bromophenyl)pyrimido[1,2-a][1,4]benzodiazepin-1(5H)-one was heated with potassium carbonate in aqueous ethanol to give 2-carboxy-11-bromo-7-(m-bromophenyl)pyrimido[1,2-a][1,4]benzodiazepin - 1-(5H)-one.

EXAMPLE 24

11-Bromo-7-(m-bromophenyl)pyrimido[1,2-a][1,4]benzodiazepin-1(5H)-one

In the manner given in Example 4, 2-carboxy-11-bromo - 7 - (m-bromophenyl)pyrimido[1,2-a][1,4]benzodiazepin-1(5H)-one was heated to 220° C. to give 11-bromo - 7 - (m-bromophenyl)pyrimido[1,2-a][1,4]benzodiazepin-1(5H)-one.

EXAMPLE 25

Diethyl[[(6,8-dicyano-5-(p-ethylsulfonylphenyl)-3H-1,4-benzodiazepine-2-yl)amino]methylene]malonate In the manner given in Example 1, 2-amino-6,8-dicyano - 5 - (p-ethylsulfonylphenyl)-3H-1,4-benzodiazepine was heated with diethyl ethoxymethylenemalonate to give diethyl[[(6,8-dicyano - 5 - (p-ethylsulfonylphenyl)-3H-1,4-benzodiazepin-2-yl)amino]methylene]malonate.

EXAMPLE 26

2-Carbethoxy-8,10-dicyano-7-(p-ethylsulfonylphenyl)pyrimido[1,2-a][1,4]benzodiazepin-1(5H)-one In the manner given in Example 2, diethyl[[(6,8-dicyano-5-(p-ethylsulfonylphenyl) - 3H - 1,4-benzodiazepine-2-yl)amino]methylene]malonate was heated with Dowtherm A (a mixture of diphenyl and diphenyloxide) to give 2-carbethoxy-8,10-dicyano - 7 - (p-ethylsulfonylphenyl)pyrimido[1,2-a][1,4]benzodiazepin-1(5H)-one.

EXAMPLE 27

2-Carboxy-8,10-dicyano-7-(p-ethylsulfonylphenyl)pyrimido[1,2-a][1,4]benzodiazepin-1(5H)-one In the manner given in Example 3, 2-carbethoxy-8,10-dicyano - 7 - (p-ethylsulfonylphenyl)pyrimido[1,2-a][1,4]benzodiazepin-1(5H)-one was heated with sodium carbonate in aqueous ethanol to give 2-carboxy - 8,10-dicyano - 7 - (p-ethylsulfonylphenyl)pyrimido[1,2-a][1,4]benzodiazepin-1(5H)-one.

EXAMPLE 28

8,10-Dicyano-7-(p-ethylsulfonylphenyl)pyrimido[1,2-a][1,4]benzodiazepin-1(5H)-one In the manner given in Example 4, 2-carboxy-8,10-dicyano - 7 - (p-ethylsulfonylphenyl)pyrimido[1,2-a][1,4]-benzodiazepin-1(5H)-one was heated to 220° C. to give 8,10-dicyano - 7 - (p-ethylsulfonylphenyl)pyrimido[1,2-a][1,4]benzodiazepin-1(5H)-one.

EXAMPLE 29

9-Chloro-7-phenylpyrimido[1,2-a][1,4]benzodiazepin-1(5H)-one-6-oxide

A stirred solution of 9-chloro-7-phenylpyrimido[1,2-a][1,4]benzodiazepin - 1(5H) - one (1.0 g.; 3.0 millimoles), in absolute ethanol, in an ice bath, was treated with m-chloroperbenzoic acid (1.0 g.; 6.0 millimoles). The mixture was allowed to stand in the ice bath for 8 hours and then at room temperature, about 24° C., for 18 hours. It was thereafter concentrated in vacuo, the residue suspended in aqueous, cold, dilute potassium carbonate solution and extracted with methylene chloride. The extract was washed with water, dried and concentrated in vacuo.

The residue was chromatographed on 100 g. of silica gel taking 50 ml. fractions. The desired product was eluted in fractions 50–70 using 10% methanol-90% ethyl acetate. The product, 9-chloro-7-phenylpyrimido[1,2-a]-[1,4]benzodiazepin-1(5H)-one - 6 - oxide was isolated by concentration of the chromatographic fraction.

EXAMPLE 30

9-Chloro-5-hydroxy-7-phenylpyrimido[1,2-a][1,4]benzodiazepin-1(5H)-one acetate

A stirred mixture of 9-chloro-7-phenylpyrimido[1,2-a]-[1,4]benzodiazepin-1(5H) - one - 6 - oxide (704 mg.; 2.0 mmoles), acetic anhydride (4.0 ml.) and acetic acid (2.5 ml.) was warmed on the steam bath, under nitrogen, for 30 minutes and concentrated in vacuo. The residue was suspended in water, neutralized with sodium carbonate and extracted with methylene chloride. The extract was dried, concentrated and chromatographed on silica gel eluting with ethyl acetate to yield 9-chloro-5-hydroxy-7-phenylpyrimido[1,2-a][1,4]benzodiazepin - 1(5H) - one acetate.

EXAMPLE 31

9-Chloro-5-hydroxy-7-phenylpyrimido[1,2-a][1,4]benzodiazepin-1(5H)-one

A stirred suspension of 9-chloro-5-hydroxy-7-phenylpyrimido[1,2-a][1,4]benzodiazepin - 1(5H) - one acetate (394 mg.; 1 millimole) in absolute ethanol (25 ml.), under nitrogen, was stirred for 3 hours at room temperature (23° C.) with 2.2 ml. of 0.5 N aqueous sodium hydroxide, then poured into water and extracted with methylene chloride. The extract was dried and concentrated and the residue chromatographed on silica gel, eluting with ethyl acetate, to yield 200 mg. of 9-chloro-5-hydroxy-7-phenylpyrimido[1,2-a][1,4]benzodiazepin-1(5H)-one.

EXAMPLE 32

9-Chloro - 5 - hydroxy-7-phenylpyrimido[1,2-a][1,4]benzodiazepin - 1(5H) - one hemisuccinate and its methyl ester A suspension of 9-chloro-5-hydroxy - 7 - phenylpyrimido-[1,2-a][1,4]benzodiazepin-1(5H)-one in pyridine is stirred for 3 hours with succinic anhydride. The mixture is then poured in ice water, the solid collected on filter and recrystallized from methanol water to give 9-chloro - 5 - hydroxy-7-phenylpyrimido[1,2-a][1,4]benzodiazepin-1(5H)-one hemisuccinate.

Treatment of this hemisuccinate with diazomethane gave methyl 9-chloro-5-hydroxy-7-phenylpyrimido[1,2-a]-[1,4]benodiazepin-1(5H)-one succinate.

EXAMPLE 33

9-Chloro-7-(o-chlorophenyl)pyrimido[1,2-a][1,4]benzodiazepin-1(5H)-one-6-N-oxide In the manner given in Example 29, 9-chloro-7-(o-chlorophenyl)pyrimido[1,2-a][1,4]benzodiazepin-1(5H) - one was treated with perbenzoic acid to give 9-chloro-5-hydroxy-7-phenylpyrimido[1,2 - a][1,4]benzodiazepin - 1 (5H)-one-6-N-oxide.

EXAMPLE 34

9-Chloro-5-hydroxy-7-(o-chlorophenyl)pyrimido [1,2-a][1,4]benzodiazepin-1(5H)-one acetate In the manner given in Example 30, 9-chloro-7-(o-chlorophenyl)pyrimido[1,2-a][1,4]benzodiazepin - 1(5H) - one-6-N-oxide was treated with acetic anhydride in acetic acid to give 9-chloro - 5 - hydroxy-7-(o-chlorophenyl)pyrimido[1,2-a][1,4]benzodiazepin-1(5H)-one acetate.

EXAMPLE 35

9-Chloro-5-hydroxy-7-(o-chlorophenyl)pyrimido [1,2-a][1,4]benzodiazepin-1(5H)-one In the manner given in Example 31, 9-chloro-5-hydroxy - 7 - (o - chlorophenyl)pyrimido[1,2-a][1,4]benzodiazepin-1(5H)-one acetate was hydrolyzed in ethanol with aqueous sodium hydroxide to give 9-chloro-5-hydroxy - 7 - (o-chlorophenyl)-pyrimido[1,2-a][1,4]benzodiazepin-1(5H)-one.

EXAMPLE 36

9-Chloro - 5 - hydroxy-7-(o-chlorophenyl)pyrimido-[1,2-a][1,4]benzodiazepin-1(5H)-one propionate.

To a solution of 9-chloro-5-hydroxy-7-(o-chlorophenyl) pyrimido[1,2 - a][1,4]benzodiazepin-1(5H)-one in pyridine is added propionic anhydride. The mixture was allowed to stand at room temperature for 6 hours and was then poured into ice water. The solids, thus produced, were recovered by filtration and recrystallized from methanol to give 9-chloro - 5 - hydroxy-7-(o-chlorophenyl)-pyrimido[1,2 - a][1,4]benzodiazepin - 1(5H)-one propionate.

EXAMPLE 37

9 - Chloro - 5 - hydroxy - 7 - (o-chlorophenyl)pyrimido-[1,2-a][1,4]benzodiazepin-1(5H) - one hemisuccinate and its ethyl ester In the manner given in Example 32, 9-chloro-5-hydroxy-7 - (o-chlorophenyl)pyrimido[1,2-a][1,4]benzodiazepin-1 (5H)-one was treated with succinic anhydride to give 9-chloro - 5 - hydroxy - 7 - (o-chlorophenyl)pyrimido[1,2-a][1,4]benzodiazepin-1(5H)-one hemisuccinate.

Treatment of this hemisuccinate with diazoethane gives ethyl 9-chloro-5-hydroxy - 7 - (o-chlorophenyl)pyrimido [1,2-a][1,4]benzodiazepine-1(5H)-one succinate.

EXAMPLE 38

2-Carbomethoxy-9-nitro - 7 - (o - chlorophenyl)pyrimido [1,2-a][1,4]benzodiazepin-1(5H)-one 6-oxide.

In the manner given in Example 29, 2-carbomethoxy-9-nitro - 7 - (o-chlorophenyl)pyrimido[1,2-a][1,4]benzodiazepin-1(5H)-one was treated with m-chloroperbenzoic acid to give 2-carbomethoxy - 9 - nitro - 7 - (o-chlorophenyl)pyrimido[1,2-a][1,4]benzodiazepin-1(5H)-one 6-oxide.

EXAMPLE 39

2-carbomethoxy - 5 - hydroxy - 9 - nitro - 7 - (o - chlorophenyl)pyrimido[1,2 - a][1,4]benzodiazepin - 1(5H)-one acetate In the manner given in Example 30, treating 2-carbomethoxy - 9 - nitro - 7 - (o-chlorophenyl)pyrimido[1,2-a][1,4]benzodiazepine with acetic anhydride in acetic acid gives 2-carbomethoxy - 5 - hydroxy - 9 - nitro-7-(o-chlorophenyl)pyrimido[1,2-a][1,4]benzodiazepin - 1(5H) - one acetate.

EXAMPLE 40

2-Carboxy - 5 - hydroxy - 9 - nitro - 7 - (o - chlorophenyl)-pyrimido[1,2-a][1,4]benzodiazepin-1(5H)-one A stirred suspension of 2-carboxy - 5 - hydroxy - 9 - nitro - 7 - (o - chlorophenyl)pyrimido[1,2-a][1,4]benzodiazepin-1(5H)-one acetate in ethanol under nitrogen, was stirred for 3 hours at room temperature (23° C.) with aqueous sodium hydroxide, poured into water and extracted with methylene chloride. The extract was dried and concentrated and the residue chromatographed on silica gel, eluting with ethyl acetate to yield 2-carboxy-5-hydroxy - 9 - nitro - 7 - (o - chlorophenyl)pyrimido[1,2-a][1,4]benzodiazepin-1(5H)-one.

EXAMPLE 41

2-Carboxy - 5 - hydroxy - 9 - nitro - 7 - (o - chlorophenyl)-pyrimido[1,2-a][1,4]benzodiazepin - 1(5H)-one hemisuccinate and its diethyl ester In the manner given in Example 34, 2-carboxy-5-hydroxy - 9 - nitro - 7 - (o - chlorophenyl)pyrimido[1,2-a][1,4]benzodiazepin-1(5H) - one was treated with succinic anhydride to give 2-carboxy-5-hydroxy-9-nitro-7-(o-chlorophenyl)pyrimido[1,2-a][1,4]benzodiazepin - 1(5H)-one hemisuccinate.

Treatment of this hemisuccinate with diazoethane gave ethyl 2-carbethoxy - 5 - hydroxy - 9 - nitro - 7 - (o-chlorophenyl)pyrimido[1,2-a][1,4]benzodiazepin - 1(5H) - one succinate.

EXAMPLE 42

2-Hydroxymethyl - 9 - chloro - 7 - phenylpyrimido[1,2-a][1,4]benzodiazepin-1(5H)-one A solution of 1 mmole of 2-carbomethoxy-9-chloro-7-phenylpyrimido[1,2-a][1,4]benzodiazepin-1(5H) - one in 10 ml. of tetrahydrofuran was treated with the stoichiometric amount of lithium aluminum hydride at room temperature and stirred for several hours. The reaction mixture was worked up by addition of water 15% aqueous sodium hydroxide solution, then stirred for 30 minutes and a product isolated by extraction with methylene chloride and chromatography to give 2-hydroxymethyl-9-chloro - 7 - phenylpyrimido[1,2-a][1,4]benzodiazepin-1(5H)-one.

EXAMPLE 43

2-Hydroxymethyl - 9 - chloro - 7 - (o-chlorophenyl)pyrimido[1,2-a][1,4]benzodiazepin-1(5H)-one In the manner given in Example 42, 2-carbomethoxy-9-chloro - 7 - (o-chlorophenyl)pyrimido[1,2-a][1,4]benzodiazepin-1(5H)-one was reduced with lithium aluminum hydride in tetrahydrofuran to give 2-hydroxymethyl-9-chloro - 7 - (o-chlorophenyl)pyrimido[1,2-a][1,4]benzodiazepin-1(5H)-one.

EXAMPLE 44

2-Hydroxymethyl - 9 - trifluoromethyl - 7 - (2,6-difluorophenyl)pyrimido[1,2-a][1,4]benzodiazepin-1(5H)-one In the manner given in Example 42, 2-carboethoxy-9-trifluoromethyl - 7 - (2,6-difluorophenyl)pyrimido[1,2-a][1,4]benzodiazepin-1(5H)-one was reduced with lithium aluminum hydride in tetrahydrofuran to give 2-hydroxymethyl - 9 - trifluoromethyl - 7 - (2,6-difluorophenyl)pyrimido[1,2-a][1,4]benzodiazepin-1(5H)-one.

EXAMPLE 45

2-Methyl-9-chloro-7-phenylpyrimido[1,2-a][1,4]-benzodiazepin-1(5H)-one

A solution of 2-hydroxymethyl - 9 - chloro-7-phenylpyrimido[1,2-a][1,4]benzodiazepin-1(5H) - one (1 mmole) in 10 ml. of pyridine was treated with 1 mmole of p-toluenesulfonyl chloride overnight. The product was isolated by ether extraction, disclosed in tetrahydrofuran, a stoichiometric amount of lithium aluminum hydride was added, and refluxed for several hours. The mixture was cooled, decomposed with ether and 15% sodium hydroxide and the product isolated to give 2-methyl-9-chloro-7-phenylpyrimido[1,2 - a][1,4]benzodiazepin - 1(5H)-one.

EXAMPLE 46

2-Methyl-9-chloro-7-(o-chlorophenyl)pyrimido[1,2-a][1,4]benzodiazepin-1(5H)-one

In the manner given in Example 45, 2-hydroxymethyl-9 - chloro-7-(o-chlorophenyl)pyrimido[1,2-a][1,4]benzodiazepin-1(5H)-one was converted to the tosylate and reduced with lithium aluminum hydride in tetrahydrofuran to give 2-methyl-9-chloro - 7 - (o-chlorophenyl)pyrimido[1,2-a][1,4]benzodiazepin-1(5H)-one.

EXAMPLE 47

2-Methyl - 8,10 - dichloro - 7 - (o-fluorophenyl)pyrimido[1,2-a][1,4]benzodiazepin-1(5H)-one In the manner given in Example 45, 2-hydroxymethyl-8,10-dichloro - 7 (o-fluorophenyl)pyrimido[1,2-a][1,4]benzodiazepin-1(5H)-one converted to the tosylate and reduced with lithium aluminum hydride in tetrahydrofuran to give 2-methyl-8,10-dichloro - 7 - (o-fluorophenyl)pyrimido[1,2-a][1,4]benzodiazepin-1(5H)-one.

In the manner given in the preceding examples other compounds of formula III can be produced. Representative compounds of formula III thus obtained, include:

9-trifluoromethyl - 7 - [(p-dipropylaminophenyl)pyrimido[1,2-a][1,4]benzodiazepin-1(5H)-one;
10-chloro - 7 - phenylpyrimido[1,2-a][1,4]benzodiazepin-1(5H)-one;
5-hydroxy-8-chloro-7-(m-bromophenyl)pyrimido[1,2-a][1,4]benzodiazepin-1(5H)-one acetate;
9-chloro-7-(3,4-dimethylphenyl)pyrimido[1,2-a][1,4]benzodiazepin-1(5H)-one;
2-carbethoxy-7-phenylpyrimido[1,2-a][1,4]benzodiazepin-1(5H)-one;
9-bromo-7-phenylpyrimido[1,2-a][1,4]benzodiazepin-1(5H)-one;
5-hydroxy-7-[(2-methyl-4-methoxyphenyl)]pyrimido[1,2-a][1,4]benzodiazepin-1(5H)-one propionate;
11-bromo-7-phenylpyrimido[1,2-a][1,4]benzodiazepin-1(5H)-one;
2-carboxy-7-phenylpyrimido[1,2-a][1,4]benzodiazepin-1(5H)-one;
9-cyano-7-phenylpyrimido[1,2-a][1,4]benzodiazepin-1(5H)-one;
ethyl 10-cyano-5-hydroxy-7-phenylpyrimido[1,2-a][1,4]benzodiazepin-1(5H)-one succinate;
2-carboxy-8-chloro-5-hydroxy-7-(m-bromophenyl)pyrimido[1,2-a][1,4]benzodiazepin-1(5H)-one;
9-chloro-7-(3,4-dimethyl)phenylpyrimido[1,2-a][1,4]benzodiazepin-1(5H)-one;
7-phenylpyrimido[1,2-a][1,4]benzodiazepin-1(5H)-one;
9-bromo-7-phenylpyrimido[1,2-a][1,4]benzodiazepin-1(5H)-one;
2-carbopropoxy-7-[(2-methyl-4-methoxyphenyl)]pyrimido[1,2-a][1,4]benzodiazepin-1(5H)-one;
11-bromo-5-hydroxy-7-phenylpyrimido[1,2-a][1,4]benzodiazepin-1(5H)-one propionate;
7-phenylpyrimido[1,2-a][1,4]benzodiazepin-1(5H)-one;
9-cyano-7-(m-trifluoromethylphenyl)pyrimido[1,2-a][1,4]benzodiazepin-1(5H)-one;
2-carbethoxy-10-cyano-5-hydroxy-7-(p-propoxyphenyl)pyrimido[1,2-a][1,4]benzodiazepin-1(5H)-one acetate;
9-chloro-7-(o-chlorophenyl)pyrimido[1,2-a][1,4]benzodiazepin-1(5H)-one;
8-ethylthio-7-(o-bromophenyl)pyrimido[1,2-a][1,4]benzodiazepin-1(5H)-one;
2-carboxy-8,10-dichloro-7-(o-fluorophenyl)pyrimido[1,2-a][1,4]benzodiazepin-1(5H)-one;
10-propoxy-9-bromo-7-[m-(ethylsulfinyl)phenyl]pyrimido[1,2-a][1,4]benzodiazepin-1(5H)-one;
11-diisopropylamino-9-methyl-7-[m-(propylsulfonyl)phenyl]pyrimido[1,2-a][1,4]benzodiazepin-1(5H)-one;
9-iodo-7-(o-fluorophenyl)pyrimido[1,2-a][1,4]benzodiazepin-1(5H)-one;
2-carbethoxy-5-hydroxy-7-(o-ethylthiophenyl)pyrimido[1,2-a][1,4]benzodiazepin-1(5H)-one acetate;
10-amino-7-(o-chlorophenyl)pyrimido[1,2-a][1,4]benzodiazepin-1(5H)-one;
9-bromo-5-hydroxy-7-(o-bromophenyl)pyrimido[1,2-a][1,4]benzodiazepin-1(5H)-one propionate;
9-dimethylamino-7-phenylpyrimido[2,2-a][1,4]benzodiazepin-1(5H)-one;

2-carbopropoxy-8,11-dichloro-7-(p-isopropylphenyl)
pyrimido[1,2-a][1,4]benzodiazepin-1(5H)-one;
8,10-dimethyl-7-(m-ethylphenyl)pyrimido[1,2-a][1,4]
benzodiazepin-1(5H)-one;
8-nitro-7-(p-cyanophenyl)pyrimido[1,2-a][1,4]
benzodiazepin-1(5H)-one;
2-carboxy-11-acetylamino-7-(p-formamidophenyl)
pyrimido[1,2-a][1,4]benzodiazepin-1(5H)-one;
and the like.

The compounds of formulas III, IIIa, IIIb, IIIc, IIId, IIIf, IIIg, IIIh, IIIi, IIIj, and IIIk may further be converted to their pharmacologically acceptable acid addition salts by reaction with stoichiometrically calculated amounts of selected acids in water, ethanol, or ether. In this manner the hydrochlorides, hydrobromides, hydriodides, sulfates, phosphates, acetates, propionates, lactates, tartrates, citrates, maleates, malates, pamoates, benzenesulfonates, p-toluenesulfonates, methanesulfonates, β-naphthalenesulfonates, cyclohexanesulfamates, salicylates, and the like of the foregoing 7-phenylpyrimido[1,2-a][1-4]benzodiazepin-1(5H)-ones of formula III are obtained.

I claim:

1. A 7-phenylpyrimido[1,2-a][1,4]benzodiazepin-1(5H)-one of the formula:

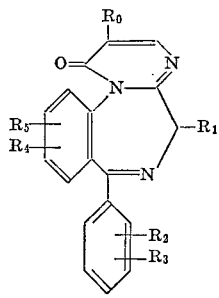

wherein $R_0$ is selected from the group consisting of hydrogen, methyl, hydroxymethyl, and —$COOR_6$ in which $R_6$ is hydrogen or alkyl of 1 to 3 carbon atoms, inclusive; wherein $R_1$ is selected from the group consisting of hydrogen, hydroxy, acetoxy, propionoxy, or succinyloxy alkyl esters in which alkyl is defined as above; and wherein $R_2$, $R_3$, $R_4$, and $R_5$ are selected from the group consisting of hydrogen, halogen, nitro, cyano, trifluoromethyl, and alkyl, alkoxy, alkylthio, alkylsulfinyl, alkylsulfonyl, and alkanoylamino in which the carbon moiety is of 1 to 3 carbon atoms, inclusive, and dialkylamino in which alkyl is defined as above, the pharmacologically acceptable acid addition salts thereof. The N-oxides thereof.

2. A 7-phenylpyrimido[1,2-a][1,4]benzodiazepin-1(5H)-one of the formula

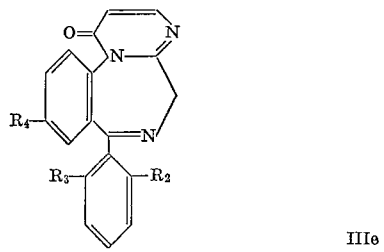

IIIa wherein $R_2$, $R_3$, and $R_4$ are selected from the group consisting of hydrogen, chlorine, fluorine, bromine, nitro, cyano, and trifluoromethyl, and the pharmacologically acceptable acid addition salts thereof.

3. A 7-phenylpyrimido[1,2-a][1,4]benzodiazepin-1(5H)-one of the formula

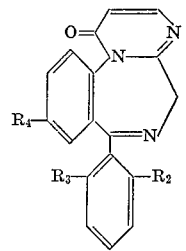

IIIk wherein $R_2$, $R_3$, and $R_4$ are selected from the group consisting of hydrogen and chlorine.

4. A compound according to claim 1 wherein $R_0$ is carbethoxy, $R_1$, $R_2$, $R_3$, and $R_5$ are hydrogen, $R_4$ is 9-chloro and the compound is therefore 2-carbethoxy-9-chloro - 7 - phenylpyrimido[1,2 - a][1,4]benzodiazepin - 1(5H)-one.

5. A compound according to claim 1 wherein $R_0$ is carbethoxy, $R_1$, $R_3$, and $R_5$ are hydrogen, $R_2$ is o-chloro, $R_4$ is 9-chloro and the compound is therefore 2-carbethoxy 9 - chloro-7-(o-chlorophenyl)pyrimido[1,2-a][1,4]benzodiazepin-1(5H)-one.

6. A compound according to claim 1 wherein $R_0$ is carboxy, $R_1$, $R_2$, $R_3$, and $R_5$ are hydrogen, $R_4$ is 9-chloro and the compound is therefore 2-carboxy-9-chloro-7-phenylpyrimido[1,2-a][1,4]benzodiazepin-1(5H)-one.

7. A compound according to claim 1 wherein $R_0$ is carboxy, $R_1$, $R_3$, and $R_5$ are hydrogen, $R_2$ is o-chloro and $R_4$ is 9-chloro and the compound is therefore 2-carboxy-9 - chloro - 7 - (o - chlorophenylpyrimido)[1,2-a][1,4]benzodiazepin-1(5H)-one.

8. A compound according to claim 2 wherein $R_2$ and $R_3$ are hydrogen, $R_4$ is chloro, and the compound is therefore 9-chloro-7-phenylpyrimdo[1,2-a][1,4]benzodiazepin-1(5H)-one.

9. A compound according to claim 3 wherein $R_2$ and $R_4$ are chlorine, $R_3$ is hydrogen and the compound is therefore 9-chloro - 7 - (o-chlorophenyl)pyrimido[1,2-a][1,4]benzodiazepin-1(5H)-one.

10. A compound according to claim 1 wherein $R_0$ is hydroxymethyl, $R_1$, $R_2$, $R_3$, and $R_5$ are hydrogen, $R_4$ is 9-chloro and the compound is therefore 2-hydroxymethyl-9-chloro - 7 - phenylpyrimido[1,2-a][1,4]benzodiazepin-1(5H)-one.

11. A compound according to claim 1 wherein $R_0$ is hydroxymethyl, $R_1$, $R_3$, and $R_5$ are hydrogen, $R_2$ is o-chloro $R_4$ is 9-chloro and the compound is therefore 2 - hydroxymethyl - 9 - chloro - 7 - (o - chlorophenyl)pyrimido[1,2-a][1,4]benzodiazepin-1(5H)-one.

12. A compound according to claim 1, wherein $R_0$ is methyl, $R_1$, $R_2$, $R_3$, and $R_5$ are hydrogen, $R_4$ is 9-chloro and the compound is therefore 2-methyl-9-chloro-7-phenylpyrimido[1,2-a][1,4]benzodiazepin-1(5H)-one.

13. A compound according to claim 1 wherein $R_0$ is methyl, $R_1$, $R_3$, and $R_5$ are hydrogen, $R_2$ is o-chloro, $R_4$ is 9-chloro and the compound is therefore 2-methyl-9-chloro - 7 - (o-chlorophenyl)pyrimido[1,2-a][1,4]benzodiazepin-1(5H)-one.

References Cited
UNITED STATES PATENTS

| | | | |
|---|---|---|---|
| 2,526,477 | 10/1950 | Heimbach | 260—256.4 |
| 3,202,512 | 8/1965 | Williams | 260—256.4 |
| 3,271,401 | 9/1966 | Williams | 260—256.4 |
| 3,468,888 | 9/1969 | Chow. | |
| 3,673,184 | 6/1972 | Minami et al. | |
| 3,689,488 | 9/1972 | Dukes. | |
| 3,796,713 | 3/1974 | Derieg et al. | |

JAMES A. PATTEN, Primary Examiner

U.S. Cl. X.R.

260—256.5 R; 424—251

UNITED STATES PATENT OFFICE
CERTIFICATE OF CORRECTION

PATENT NO. : 3,842,080
DATED : October 15, 1974
INVENTOR(S) : Jacob Szmuszkovicz It is certified that error appears in the above-identified patent and that said Letters Patent are hereby corrected as shown below:

Column 4, lines 165-75: Formula IIIj should appear as shown below instead of as in the patent:

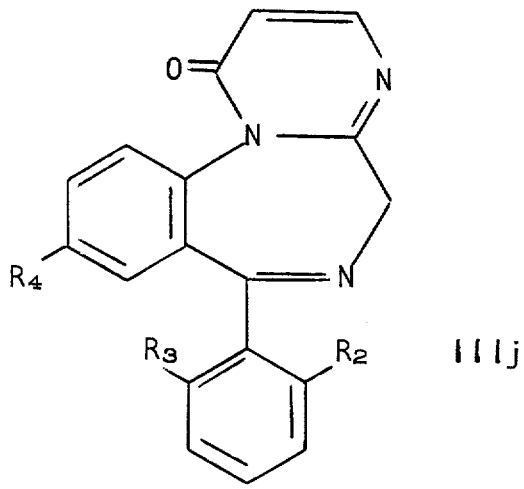

Column 5, line 24, "acid salts" should read -- acid addition salts Column 6, line 5, "or zoo" should read -- or for zoo --. Column 9, line 57, "[[7-" should read -- [[(7- --. Column 10, line 21, "dimethl" should read -- dimethyl --; line 38, "1(5H-one" should read -- -1(5H)-one --.

Signed and Sealed this

Twentieth Day of July 1976

[SEAL]

Attest:

RUTH C. MASON
Attesting Officer

C. MARSHALL DANN
Commissioner of Patents and Trademarks